(12) United States Patent
Chao et al.

(10) Patent No.: US 6,909,426 B2
(45) Date of Patent: Jun. 21, 2005

(54) TABLET SYSTEM WITH INDUCTIVE LOOPS AND CORD LESS-BATTERY LESS POINTER APPARATUS CONTROLLED BY MULTI-CHANNEL SWITCHES SET AND METHOD FOR TRANSMITTING AND RECEIVING ITS SIGNAL

(75) Inventors: Ching-Chuan Chao, Taipei (TW); Chung-Wen Hsu, Kaohsiung (TW)

(73) Assignee: Aiptek International, Inc.

( * ) Notice: Subject to any disclaimer, the term of this patent is extended or adjusted under 35 U.S.C. 154(b) by 290 days.

(21) Appl. No.: 10/378,516

(22) Filed: Mar. 3, 2003

(65) Prior Publication Data

US 2004/0174343 A1 Sep. 9, 2004

(51) Int. Cl.$^7$ ............................................... G06K 11/06
(52) U.S. Cl. ...................... 345/173; 345/156; 345/157; 345/174; 178/18.01; 178/18.03; 178/18.07; 178/19.01; 178/19.03; 178/20.01; 340/870.36; 341/5; 341/15
(58) Field of Search ............................... 345/156, 157, 345/173, 174; 178/18.01, 18.03, 18.07, 19.01, 20.01; 340/870.36; 341/5, 15

(56) References Cited

U.S. PATENT DOCUMENTS

| | | | | |
|---|---|---|---|---|
| 4,878,553 A | * | 11/1989 | Yamanami et al. ...... | 178/18.07 |
| 4,996,393 A | * | 2/1991 | Zalenski et al. ......... | 178/18.07 |
| 5,194,699 A | * | 3/1993 | Zalenski .................. | 178/18.07 |
| 5,239,489 A | * | 8/1993 | Russell .................... | 701/37 |
| 5,276,282 A | * | 1/1994 | Russell .................... | 178/18.07 |
| 5,530,210 A | * | 6/1996 | Fukuzaki ................. | 178/20.01 |

* cited by examiner

Primary Examiner—Bipin Shalwala
Assistant Examiner—Vincent E. Kovalick
(74) Attorney, Agent, or Firm—Clement Cheng (57) ABSTRACT

The purpose of the present invention is to reduce power consumption caused by controlling circuit in transmitting/receiving process between tablet system and cord less-battery less pointer apparatus. The present invention provides multi-channel switches set produced in semiconductor process to replace traditional analog switch and tri-state element used in prior art as signal transmitting/receiving selector of inductive loops of tablet, which can simplify controlling circuit, enhance power efficiency of signal transmitting/receiving between tablet system and cord less and cell less pointer apparatus, and increase speed of response of signal transmitting/receiving between tablet and cord less-battery less pointer apparatus.

15 Claims, 5 Drawing Sheets

TABLET SYSTEM WITH INDUCTIVE LOOPS AND CORD LESS-BATTERY LESS POINTER APPARATUS CONTROLLED BY MULTI-CHANNEL SWITCHES SET AND METHOD FOR TRANSMITTING AND RECEIVING ITS SIGNAL

BACKGROUND OF THE PRESENT INVENTION 5-1. Field of the Present Invention

The present invention relates to a tablet system with inductive loops controlled by multi-channel switches set and cord less-battery less pointer apparatus and its signal transmitting and receiving method, and more particularly, to a tablet system with inductive loops controlled by bi-polar multi-channel switches set and cord less-battery less pointer apparatus and its signal transmitting and receiving method.

5-2. Description of the Prior Art

Since a handwriting input apparatus can replace a mouse and allow users to input words and pictures by hand, more easily than a mouse, the field of improvement of a handwriting input apparatus has developed rapidly in recent years. The early handwriting input apparatus replaces a mouse with a pen. In order to increase the convenience of operation for the user, a cordless pointer apparatus, such as a pen, a mouse, a puck or a stylus with a digitizer tablet is usually used. The tip of the cordless pen or stylus corresponds with the left key of the mouse. Although conventional pen-input products have existed for several years, similar kinds of products generally focus on the application of a single function such as graphing, drawing or Chinese text key-in.

The conventional electromagnetic inductive system is equipped with a digitizer tablet and a mouse or pen-transducer/pointer apparatus. Generally speaking, there are two modes of presented the position the pointer apparatus located on the active area of the tablet: the relative mode and the absolute mode. The mechanical or optical type mouse apparatus generally functions in the relative mode, that is to say, when the mouse glides on the surface of the mouse pad, the computer system receives the cursor information from the mouse and it can only identify the relative movement in X and Y directions. A common technique is to implement a pair of mutually perpendicular altering signals in the mouse, these two signals corresponding to the longitudinal and transverse movement of the mouse. In contrast, the cursor apparatus of the tablet, such as cordless pointer apparatus, generally functions in the absolute mode. As far as the computer system is concerned, once the pointer apparatus is operated and moved to another place on the active area of the tablet, the signal changes in order to response the new absolute coordinates of the pointer apparatus. Nowadays, there have already been several methods for positioning the pointer apparatus on the active area of the tablet, and the electromagnetic field inductive technique is the technique that generally applies to the absolute mode. The early transducer/pointer apparatus were connected to the tablet with a set of wires, delivering the information of coordinates and switch/pressure status to the computer system with interface. Some cordless transducers/pointer apparatus in the prior art indicated the use of different functions by changing the frequency and/or phase, the functions included, pressing down the button, pressing the tip of the pointer apparatus on the active area, and other similar functions. However, without careful handling, the change in frequency and phase could easily cause misjudgment in the desired function of the pointer apparatus because of various external factors such as metallic objects, noise signals, exterior electromagnetic fields, etc. These problems become extraordinarily obvious when it comes to tablets of larger size. The conventional technique for improvement made to the tablet system, allows users to operate the pointer apparatus with tablet system in dual mode, and therefore the information regarding relative mode and absolute mode can both be provided under the user's control.

The current pointer/input product is usually an electromagnetic inductive system. The electromagnetic inductive system usually comprises an electromagnetic pointer apparatus and a tablet. The electromagnetic pointer apparatus has an oscillation circuit and a battery, providing energy for transmitting the relative electromagnetic signal. Take the electromagnetic pointer apparatus for example, when the tip of the pointer apparatus is pressed, the inductance of the inductor changes, therefore the oscillation frequency also changes. The higher the pressure received by the pointer apparatus, the greater the inductance changes, and the oscillation frequency, therefore the magnitude of the pressure exerted upon the pointer apparatus tip can be obtained through the changing degree of frequency. There are also two switch keys on the side of the cordless pointer apparatus, the on/off status changes the transmitting frequency and the connecting/disconnecting a specific capacitor in the oscillation circuits. When the user presses the switch key, it can be identified through detecting the variation of frequency.

The tablet also comprises elements such as a detective loop, an amplifier, and an ADC and so on. The central writing area of this conventional handwriting tablet is plaited by inductive loops, the layout is composed of double layers of a PCB and the inductive loops with two axial arranged in an array of equal distance. The major use of these inductive loops is to induce the electromagnetic signal transmitted by the electromagnetic pointer apparatus. When the electromagnetic pointer apparatus transmits the electromagnetic signal, these inductive loops will induce the electromagnetic signal and the microprocessor will receive the processed information of the pointer apparatus through a signal processing circuit. Generally speaking, the inductive loops of the conventional electromagnetic inductive apparatus and its layout design makes the inductive loops a grid net with the X and Y axis arranged in an array at equal distance in order to induce the signal emitted from the electromagnetic pointer apparatus and figure out its absolute coordinates. Since the intensity of the magnetic field is an inverse proportion to the square of distance, the farther the distance between the electromagnetic pointer apparatus that's transmitting the electromagnetic field and the inductive loops, the weaker is the signal induced by the inductive loops; in contrast, the nearer the distance between the electromagnetic pointer apparatus that's transmitting the electromagnetic field and the inductive loops, the stronger is the signal induced by the inductive loops. Therefore, as long as the microprocessor of the tablet can scan through all the inductive loops one by one in sequence, and analyze the strength of the signals induced by each inductive loop, the inductive loops in which dominates the range the electromagnetic pointer apparatus located can be identified. The coordinates of its position can be figured out. However, as far as a tablet of a larger size is concerned, the number of inductive loops arranged also increases, and therefore more loop switches are needed.

On the other hand, the development of current information products is aimed at a high-speed and high data rate process with multiple and excellent functions. But as the speed of processing and data rate increase, the phenomenon of electromagnetic interference will happened often. In some specific occasions of operating tablet system, there are usually other information products being used. Therefore the conventional tablet is easily interfered with by exterior electromagnetic fields and thus misjudgment is a result. As far as the tablet of a larger active area is demanded in commerce is concerned, the number of inductive loops needed increases, and therefore the number of loop switches will also increase greatly without a doubt. This limits the miniaturization of a PCB for a handwriting tablet and makes it difficult to design and produce a tablet with the small boundary. Therefore, an electromagnetic inductive system with a battery-less pointer apparatus and multi-inductive loop layout with a coordinate-locating procedure is disclosed by the present invention according to the above said purpose. The multi-inductive loop layout of the present invention comprises a multi-inductive loop group deployed according to an inductive loop deployment table. The inductive loop layout in the inductive loop deployment table comprises a plurality of physical inductive loops that are distributed along the X and Y axis of the two-dimensional orthogonal coordinates system and each physical inductive loop comprises a plurality of logical inductive loops. As far as each physical inductive loop that's distributed in the same direction is concerned, the logical inductive loops that are adjacent to the two sides of each logical inductive loop belong to a different physical inductive loop. Besides, the scanning procedure is to scan the physical inductive loops with the loop deployment table built-in microprocessor. First, each loop switch is switched on its physical inductive loop in sequence to transmit an electromagnetic signal. When the battery-less pointer apparatus is in the region of the multi-inductive loop layout, it induces the electromagnetic energy transmitted by the physical inductive loop. After the cord less-batter less pointer apparatus induces and stores the energy, the bi-direction loop switch of the physical inductive loop stops transmitting energy and starts to induce the energy transmitted by the battery-less pointer apparatus. On the other hand, the positioning procedure of the battery-less pointer apparatus of the electromagnetic inductive system includes, [Full Scan] and its [Partial Scan] procedure of X and Y direction in order to detect the first signal, possessing the highest voltage, the second signal, possessing the voltage second to the highest, and the third signal, possessing the third highest voltage orderly and figure out the accurate coordinates of the battery-less pointer apparatus through the calculation of the internal circuit processing and microprocessor of the electromagnetic inductive system.

Figure 1:
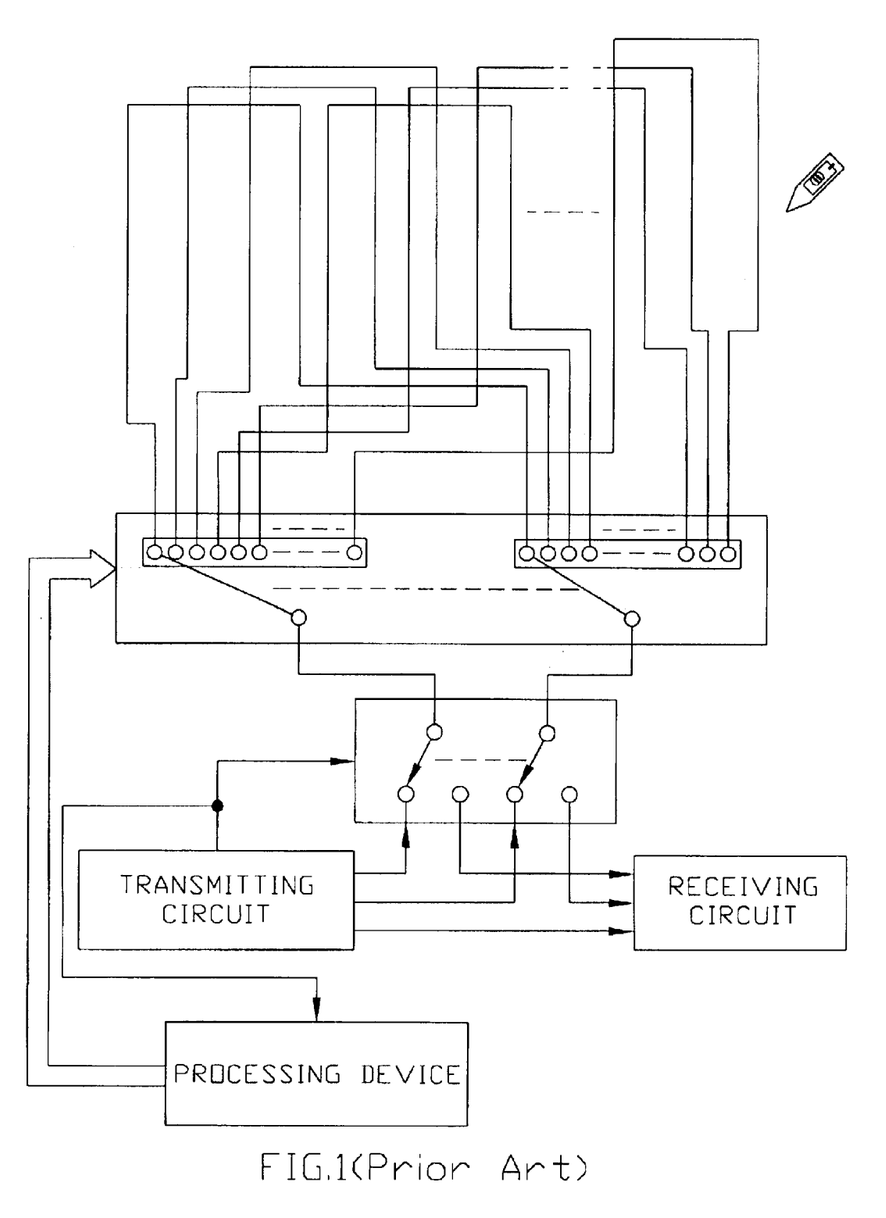
FIG. 1 is a diagram of circuit of prior art.
Figure 2:
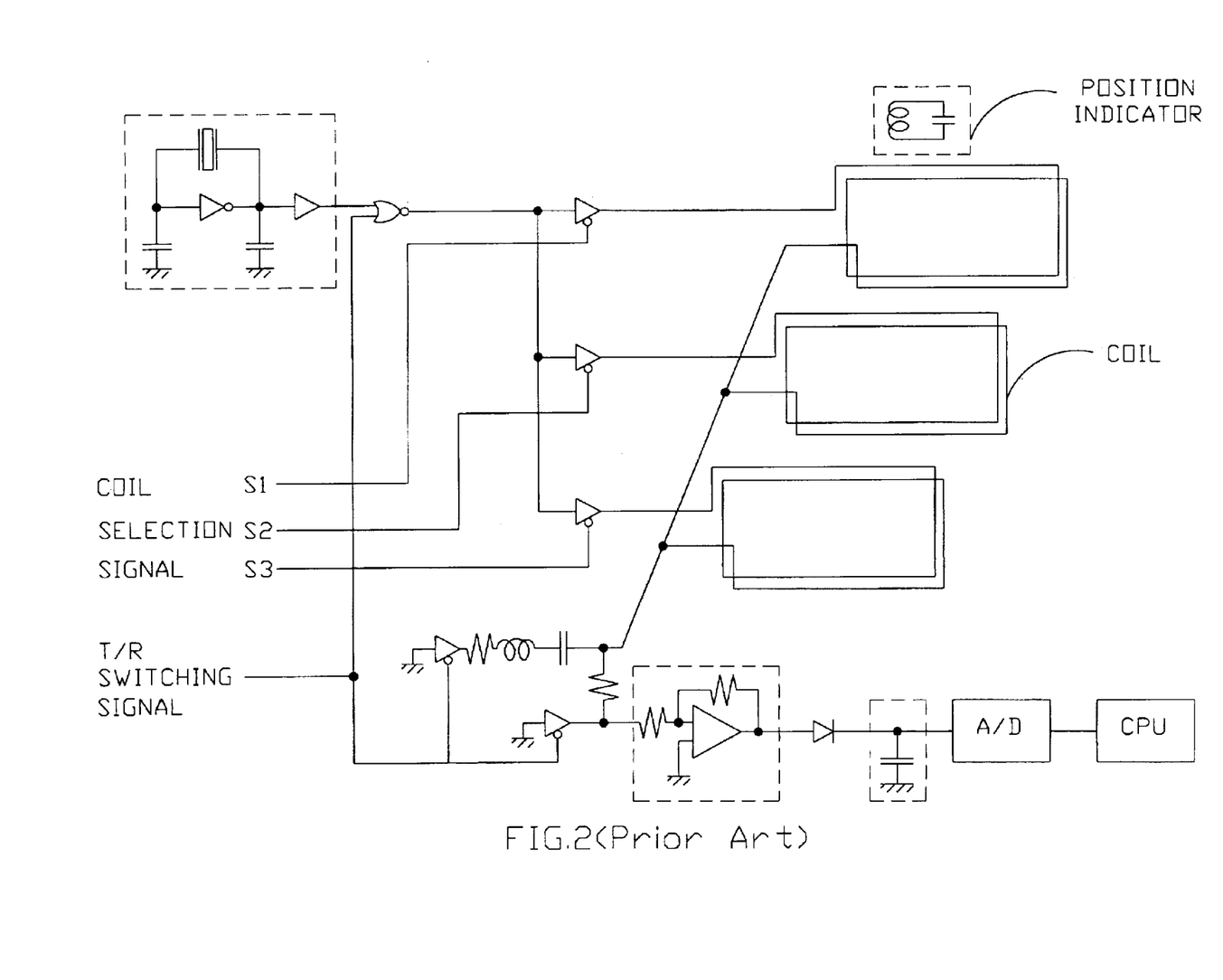
FIG. 2 is another diagram of circuit of prior art.

Besides, there are also different methods for controlling signal transmitting and receiving circuit between digitizer tablet system and cord less-battery less pointer apparatus in prior art. One of the methods is "Position Detecting Apparatus" shown in FIG. 1, U.S. Pat. No. 4,878,553, two ends of loop coil of which being connected with two respective analog selecting switch for controlling respectively signal transmitting/receiving; and another two analog synchronous switches have to be used for connecting transmitting circuit and receiving circuit to make loop coil transmit and receive signal. Therefore, four analog selecting switches have to be connected and used each time signal is transmitted or received. Since each analog selecting switch has "ON" impedance, the impedance in series connecting increases as more analog selecting switches are used, and therefore too much power will be consumed on impedance in series connection while transmitting/receiving, thus weakens the signal transmitted/received, and even stops digitizer tablet system from operating since cord less-battery less pointer apparatus cannot complete storage of energy in certain cycle and cannot transmit enough electromagnetic energy. Moreover, when conventional analog switch is in on/off action, since it needs longer response time, signal transmitting/receiving will be delayed as analog switches in series connection increases, which restricts response time of digitizer tablet system and thus affects processing speed of digitizer tablet system of greater area; and, the circuit can only transmit signal in one way, which means there is only one direction for signal to flow in loop coil, therefore there is still room for improvement in application efficiency of transmitting power.

Furthermore, in order to eliminate the defect caused by using analog selecting switch in above-mentioned U.S. Patent, in U.S. Pat. No. 5,330,210, analog selecting switch is replaced by three-status elements having function of logical element, the purpose of which is, with high speed response and low impedance of switched-on logical element, increasing power efficiency of transmitting/receiving to reduce signal decline and increase response speed caused by too many analog selecting switches. However, three-status element can be on in only one direction, therefore different logical elements and different routes have to be used while transmitting/receiving, and thus complicates the circuit and causes more noise and higher cost.

SUMMARY OF THE PRESENT INVENTION

According to what is said above, there is a still space for improvement concerning inductive loops on digitizer tablet system and application efficiency of controlling circuit while transmitting/receiving. In order to reduce power consumption caused by controlling circuit while transmitting/receiving between digitizer tablet system and cord less-battery less pointer apparatus, the present invention provides a multi-channel switches set produced in semiconductor process as transmitting/receiving selector of inductive loops of digitizer tablet to replace conventional analog switches and tri-state element used in prior art, which can simplify controlling circuit, increase power efficiency of signal transmitting/receiving between digitizer tablet system and cord less-battery less pointer apparatus, reduce noise while transmitting/receiving, and increase response speed of signal transmitting/receiving between digitizer tablet system and cord less-battery less pointer apparatus.

The main purpose of the present invention is to provide a signal transmitting/receiving system between digitizer tablet system with inductive loops controlled by multi-channel switches set and cord less-battery less pointer apparatus for controlling loop switches of inductive loops and as transmitting/receiving selector of inductive loops of digitizer tablet system, which can simplify controlling circuit of inductive loops, and effectively increases power efficiency of signal transmitting/receiving between inductive loops and cord less-battery less pointer apparatus.

Another main purpose of the present invention is to provide a method for transmitting/receiving signal between inductive loops controlled by multi-channel switches set of digitizer tablet system and cord less-battery less pointer apparatus, in which an IC having the function of multi-channel switches set being loop selecting circuit of digitizer tablet system while transmitting/receiving signal, and therefore, each channel switch being a loop switch. While transmitting signal, a specific channel can be selected by channel selector to turn on a specific loop switch and form a close inductive loop for digitizer tablet system to provide an inductive loop that is connected with turned-on channel with electric power source (VCC) for transmitting electromagnetic energy. While receiving signal, a specific loop switch can be turned on through selecting of channel selector, but this turned-on channel is not the channel that is turned-on while transmitting signal and is for receiving another signal transmitted by cord less-battery less pointer apparatus.

Still another main purpose of the present invention is to provide a digitizer tablet system with inductive loops controlled by multi-channel switches set as transmitting/receiving selector of inductive loops of digitizer tablet system, which can simplify controlling circuit of inductive loops, further increases power efficiency of signal transmitting/receiving between inductive loops and cord less-battery less pointer apparatus, and increases the signal to noise ratio (S/N Ratio) of digitizer tablet system.

And still another main purpose of the present invention is to provide a switch for controlling digitizer tablet system with inductive loops, multi-channel switches set being used as controlling circuit of digitizer tablet system while transmitting/receiving signal. While transmitting/receiving signal, a specific channel can be selected by channel selector to turn on a certain corresponding channel so that a close loop can be formed between digitizer tablet system and inductive loops while transmitting signal, and therefore an inductive loop to which the turned-on channel is connected can be provided with VCC for transmitting electromagnetic energy. While receiving signal, a certain corresponding channel can also be turned on through selecting of channel selector. But this turned-on channel may be different from the channel turned-on while transmitting signal and is for receiving another signal transmitted by cord less-battery less pointer apparatus. Besides, while receiving signal, a specific VCC switch will be kept in grounding status for keeping electric level of signal receiving at zero status.

The present invention provides a method for providing inductive loops with bi-polar electric power source and a digitizer tablet system in which signal transmitting/receiving between inductive loops and cord less-battery less pointer apparatus is controlled by multi-channel switches set, comprising: a cord less-battery less pointer apparatus, receiving a first electromagnetic signal transmitted by an inductive loop and storing electric energy through electromagnetic induction for transmitting a second electromagnetic signal. Multi-channel switches set, electrically connected with a microprocessor, an amplifier circuit and inductive loops, selecting a specific inductive loop to transmit/receive the first electromagnetic signal/the second electromagnetic signal when the digitizer tablet system is in the transmitting/receiving duration. The multi-channel switches set further comprises: a bi-polar electric power source switches and its controlling circuits, controlling "on" or "off" status of electric power source switches through a transmitting/receiving signal and a electric power source signal; a channel selector, electrically connected with a microprocessor, turning on a specific switch and transmitting/receiving signal through inductive loops in order according to scanning (channel selecting) signal transmitted by microprocessor in transmitting/receiving duration; and a channel switches set, electrically connected with inductive loops set, selecting a corresponding channel according to signal of channel selector and electrically connecting the channel and electric power source switches/amplifier circuit. An inductive loops set, one end being respectively electrically connected with channel switches set and the other end electrically connected with bi-polar electric power source switches and an amplifier circuit for forming a close loop and transmitting a first electromagnetic signal in transmitting duration and receiving a second electromagnetic signal transmitted by cord less-battery less pointer apparatus in receiving duration. An amplifier circuit, electrically connected with multi-channel switches set, having the function of amplifying the second electromagnetic signal received. A position signal converting circuit, electrically connected with amplifier circuit and an analog to digital converter, having the function of converting the received signal that is amplified. A pressure signal converting circuit, electrically connected with amplifier circuit and an analog to digital converter, having the function of converting the received signal that is amplified. An analog to digital converter, electrically connected with position signal converting circuit and pressure signal converting circuit, having the function of converting analog signal converted by position signal converting circuit and pressure signal converting circuit to digital signal. A microprocessor, electrically connected with multi-channel switches set and analog to digital converter, providing transmitting/receiving signal and electric power source signal, having the function of providing scanning (channel selecting) signal, and calculating the coordinates of cord less-battery less pointer apparatus according to digital signal provided by analog to digital converter.

The present invention further provides a method for providing inductive loops with bi-polar electric power source and method for transmitting and receiving signal between inductive loops controlled by multi-channel switches set and cord less-battery less pointer apparatus in digitizer tablet system, the transmitting and receiving method comprising: first, providing a transmitting controlling signal to start transmission of signal while transmitting signal, a transmitting signal in high electric level "1" in the embodiment, and providing an electric power source signal, in first high electric level "1" period of electric power source signal, turning on two specific switches in controlling circuits (the other two switches being "off" status) and connecting the two switches respectively to a VCC and a grounding, which connecting one end of inductive loop to VCC and the other end to grounding; and a scanning signal (channel selecting signal) being provided for channel selector by the microprocessor synchronously for corresponding a specific switch and turning on the specific channel, making inductive loop a close loop and providing the inductive loop with the VCC; then, also in transmitting duration, in first low electric level "0" period of electric power source signal, turning on the other two specific switches in controlling circuits (also, the other two switches being "off" status) and connecting the two switches respectively to one grounding and one VCC, which connecting one end of inductive loop to grounding and the other end to VCC, therefore the direction of current in inductive loop in high electric level of electric power source signal being opposite to that in low electric level of electric power source signal; wherein the frequency of electric power source signal almost equaling resonance frequency of resonance circuit of pointer apparatus for inducting the strongest signal; in transmitting duration, providing an amplifier enable/disable signal for keeping amplifier circuit in disable status; then, according to period of electric power source signal in transmitting duration, practicing repetitively. While receiving signal, providing a receiving controlling signal to start receiving of signal, a receiving signal in low electric level "0" in the embodiment, and providing an electric power source signal, for keeping the electric power source switches and electrically connected with common contact in grounding status; and a scanning signal (channel selecting signal) being provided for channel selector by the microprocessor synchronously for corresponding a specific channel and turning on the specific channel, making inductive loop a close loop for receiving the electromagnetic signal transmitted by a cord less-battery less pointer apparatus.

DETAILED DESCRIPTION OF THE PRESENT INVENTION

What is discussed in the present invention is a digitizer tablet system with inductive loops controlled by switches and cord less-battery less pointer apparatus and method for transmitting/receiving signal. In order to make the present invention thoroughly comprehended, detailed circuit structure and signal transmitting/receiving steps will be provided in the following description. However, in order to avoid unnecessary limit to the present invention, description of conventional digitizer tablet system and inductive loops are not concluded in the following. The preferred embodiment of the present invention will be described in detail as follows, and beside the embodiment described in detail, the present invention can also be widely applied in other embodiments, therefore the scope of the present invention is confined in the appended claims.

The present invention first provides a digitizer tablet system in which signal transmitting/receiving between inductive loops and cord less-battery less pointer apparatus is controlled by multi-channel switches set, comprising: a cord less-battery less pointer apparatus, receiving a first electromagnetic signal transmitted by an inductive loop and storing electric energy through electromagnetic induction for transmitting a second electromagnetic signal. Multi-channel switches set, electrically connected with a microprocessor, an amplifier circuit and the inductive loops set, selecting a specific inductive loop to transmit/receive the first electromagnetic signal and the second electromagnetic signal when the digitizer tablet system is in transmitting/receiving duration, the multi-channel switches set further comprising: a power switches and controlling circuits, controlling "on" or "off" status of switches through a transmitting/receiving signal and an electric power source signal; a channel selector, electrically connected with microprocessor, turning on a specific channel and transmitting/-receiving signal through inductive loops in sequence according to scanning (channel selecting) signal transmitted by microprocessor in transmitting/receiving duration of digitizer tablet system; and a channel switches set, electrically connected with inductive loops set, selecting a corresponding channel according to signal of channel selector and electrically connecting the channel, electric power source switches, controlling circuits, and amplifier circuit. An inductive loops set, one end being respectively electrically connected with channel switches set and the other end electrically connected with a common node for forming a close loop and transmitting a first electromagnetic signal in transmitting duration and receiving a second electromagnetic signal transmitted by cord less-battery less pointer apparatus in receiving duration. An amplifier circuit, electrically connected with multi-channel switches set, having the function of amplifying the second electromagnetic signal received. A position signal converting circuit, electrically connected with amplifier circuit and analog to digital converter, having the function of converting the amplified signal to position signal. A pressure signal converting circuit, electrically connected with amplifier circuit and analog to digital converter, having the function of converting the amplified signal to pressure signal. An analog to digital converter, electrically connected with position signal converting circuit and pressure signal converting circuit, having the function of converting analog signal converted by position signal converting circuit and pressure signal converting circuit to digital signal. A microprocessor, electrically connected with multi-channel switches set and analog to digital converter, providing transmitting/receiving controlling signal and electric power source signal, having the function of providing scanning (channel selecting) signal, and calculating the coordinates of cord less-battery less pointer apparatus according to digital signal provided by analog to digital converter.

The present invention then provides a method for transmitting and receiving signal between inductive loops controlled by multi-channel switches set and cord less-battery less pointer apparatus in digitizer tablet system, the transmitting and receiving method comprising: first, providing a transmitting/receiving controlling signal to start transmission of signal while transmitting signal, a transmitting signal is in high electric level "1" in the embodiment, and providing a electric power source signal, in first high electric level "1" period of electric power source signal, turning the electric power source switch on and connecting the electric power source switch to a VCC. And while transmitting signal, a scanning signal (channel selecting signal ) being provided for channel selector by the microprocessor for corresponding a specific switch and turning on the specific channel, making inductive loop a close loop and providing the inductive loop with the VCC; then, also in transmitting duration, in first low electric level "0" period of electric power source signal, keeping electric power source switch in "off" (open) status; in transmitting duration, providing an amplifier enable/disable signal for keeping amplifier circuit in disable status; then, according to the period of electric power source signal in this transmitting duration, practicing repetitively. While receiving signal, providing a receiving signal in low electric level "0" and a first high electric level "1" of electric power source signal, for keeping the electric power source switch in "off" (open) status; and a scanning (channel selecting) signal being provided to channel selector by the microprocessor for corresponding a specific switch and turning on the specific channel; and, receiving the electromagnetic signal transmitted by the cord less-battery less pointer apparatus.

The present invention again provides a digitizer tablet system in which signal transmitting/receiving between inductive loop and cord less-battery less pointer apparatus is controlled by multi-channel switches set that provides inductive loops with bi-polar electric power source, comprising: a cord less-battery less pointer apparatus, receiving a first electromagnetic signal transmitted by an inductive loop and storing electric energy through electromagnetic induction for transmitting a second electromagnetic signal. Multi-channel switches set, electrically connected with a microprocessor, an amplifier circuit and the inductive loops, selecting a specific inductive loop to transmit/receive the first electromagnetic signal and the second electromagnetic signal when the digitizer tablet system is in transmitting/receiving duration, the multi-channel switches set further comprising: a bi-polar electric power source switches and controlling circuits, controlling "on" or "off" status of electric power source switches through a transmitting/receiving signal and a electric power source signal; a channel selector, electrically connected with a microprocessor, turning on a specific switch and transmitting/receiving signal through inductive loop in sequence according to scanning (channel selecting ) signal transmitted by microprocessor in transmitting/receiving duration of digitizer tablet system; and a channel switches set, electrically connected with inductive loops set, selecting a corresponding channel according to signal of channel selector and electrically connecting the channel, bi-polar electric power source switch, controlling circuits, and amplifier circuit. An inductive loops set, one end being respectively electrically connected with channel switches set and the other end electrically connected with bi-polar electric power source switches and an amplifier circuit for forming a close loop and transmitting a first electromagnetic signal in transmitting duration and receiving a second electromagnetic signal transmitted by cord less-battery less pointer apparatus in receiving duration. An amplifier circuit, electrically connected with multi-channel switches set, having the function of amplifying the second electromagnetic signal received. A position signal converting circuit, electrically connected with amplifier circuit and analog to digital converter, having the function of converting the amplified signal to position signal. A pressure signal converting circuit, electrically connected with amplifier circuit and analog to digital converter, having the function of converting the amplified signal to pressure signal. An analog to digital converter, electrically connected with position signal converting circuit and pressure signal converting circuit, having the function of converting analog signal converted by position signal converting circuit and pressure signal converting circuit to digital signal. A microprocessor, electrically connected with multi-channel switches set and analog to digital converter, providing transmitting/receiving controlling signal and electric power source signal, having the function of providing scanning signal (channel selecting signal), and calculating the coordinates of cord less-battery less pointer apparatus according to digital signal provided by analog to digital converter.

The present invention then provides a method for transmitting and receiving signal of a digitizer tablet system in which signal transmitting/receiving between inductive loops and cord less-battery less pointer apparatus is controlled by multi-channel switches set that provides inductive loops with bi-polar electric power source, the transmitting and receiving method comprising: first, providing a transmitting/receiving controlling signal to start transmission of signal while transmitting signal, a transmitting signal in high electric level "1" in the embodiment, and providing a electric power source signal, in first high electric level "1" period of electric power source signal, turning on two specific electric power source switches and connecting the two switches respectively to a VCC and a grounding, which connecting one end of inductive loop to VCC and the other end to grounding; and a scanning signal (channel selecting signal) being provided for channel selector by the microprocessor synchronously for corresponding a specific switch and turning on the specific channel, making inductive loop a close loop and providing the inductive loop with the VCC; then, also in transmitting duration, in first low electric level "0" period of electric power source signal, turning on the other two specific electric power source switches and connecting the two switches respectively to a grounding and a VCC, which connecting one end of inductive loop to grounding and the other end to VCC, therefore the direction of current in inductive loop in high electric level timing of electric power source signal being opposite to that in low electric level timing of electric power source signal; wherein the frequency of electric power source signal almost equaling resonance frequency of resonance circuit of pointer apparatus for inducting the strongest signal; in transmitting duration, providing an amplifier enable/disable signal for keeping amplifier circuit in disable status; then, according to period of electric power source signal in this transmitting duration, practicing repetitively. While receiving signal, providing a receiving controlling signal to start receiving of signal, a receiving duration in low electric level "0" in the embodiment, and providing a VCC controlling signal, for keeping the electric power source switch on and connecting with common node in grounding status; and a scanning signal (channel selecting signal) being provided for channel selector by the microprocessor synchronously for corresponding a specific switch and turning on the specific channel, making inductive loop a close loop for receiving the electromagnetic signal transmitted by a cord less-battery less pointer apparatus.

Figure 3:
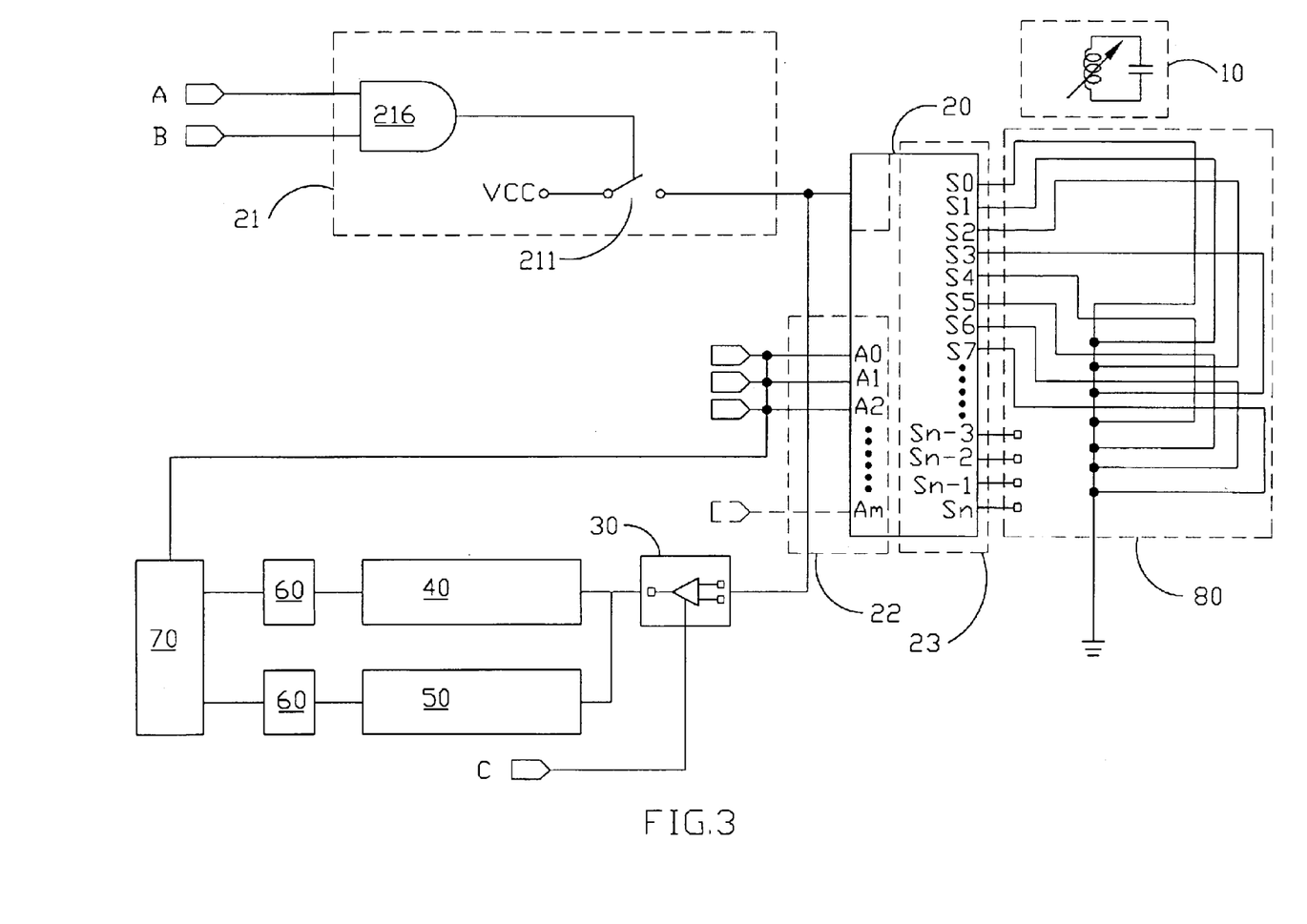
FIG. 3 is a diagram of circuit of specific embodiment of the present invention.
Figure 4A:
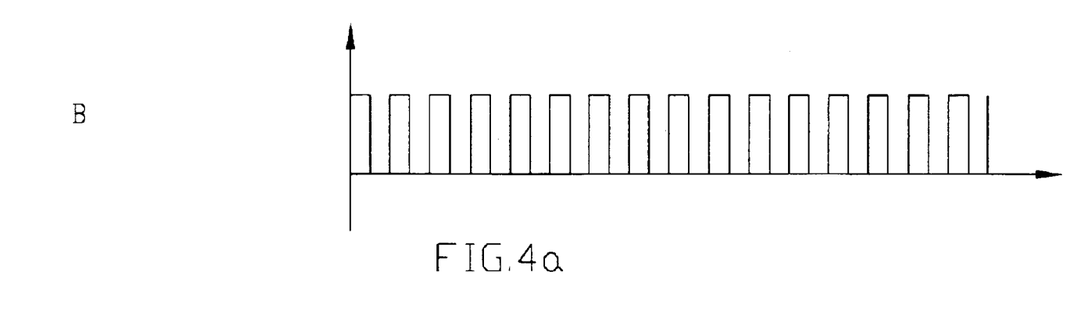
FIG. 4a is a diagram of electric power source signal of specific embodiment of the present invention.
Figure 4B:
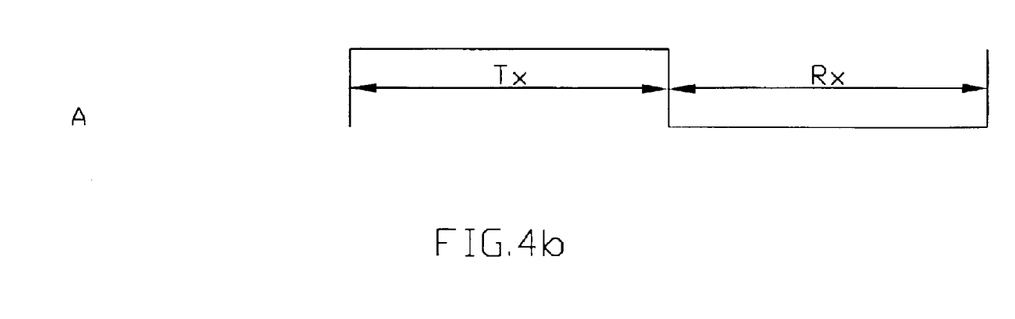
FIG. 4b is a diagram of transmitting/receiving signal of specific embodiment of the present invention, wherein Tx meaning transmitting period, Rx meaning receiving period.
Figure 4C:
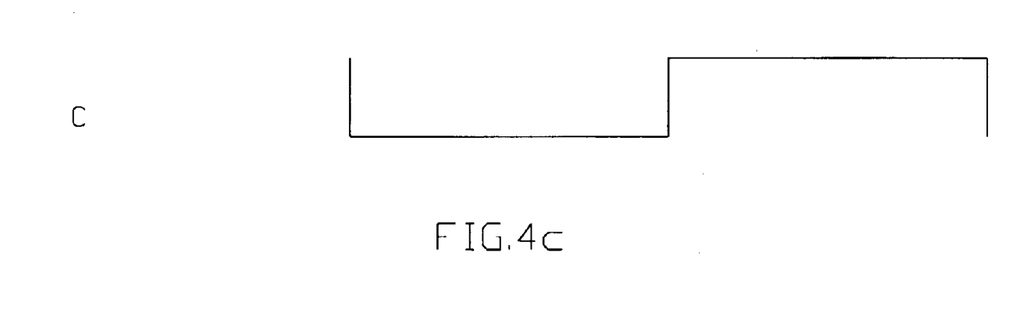
FIG. 4c is a diagram of amplifier enable/disable signal of specific embodiment of the present invention.
Figure 5:
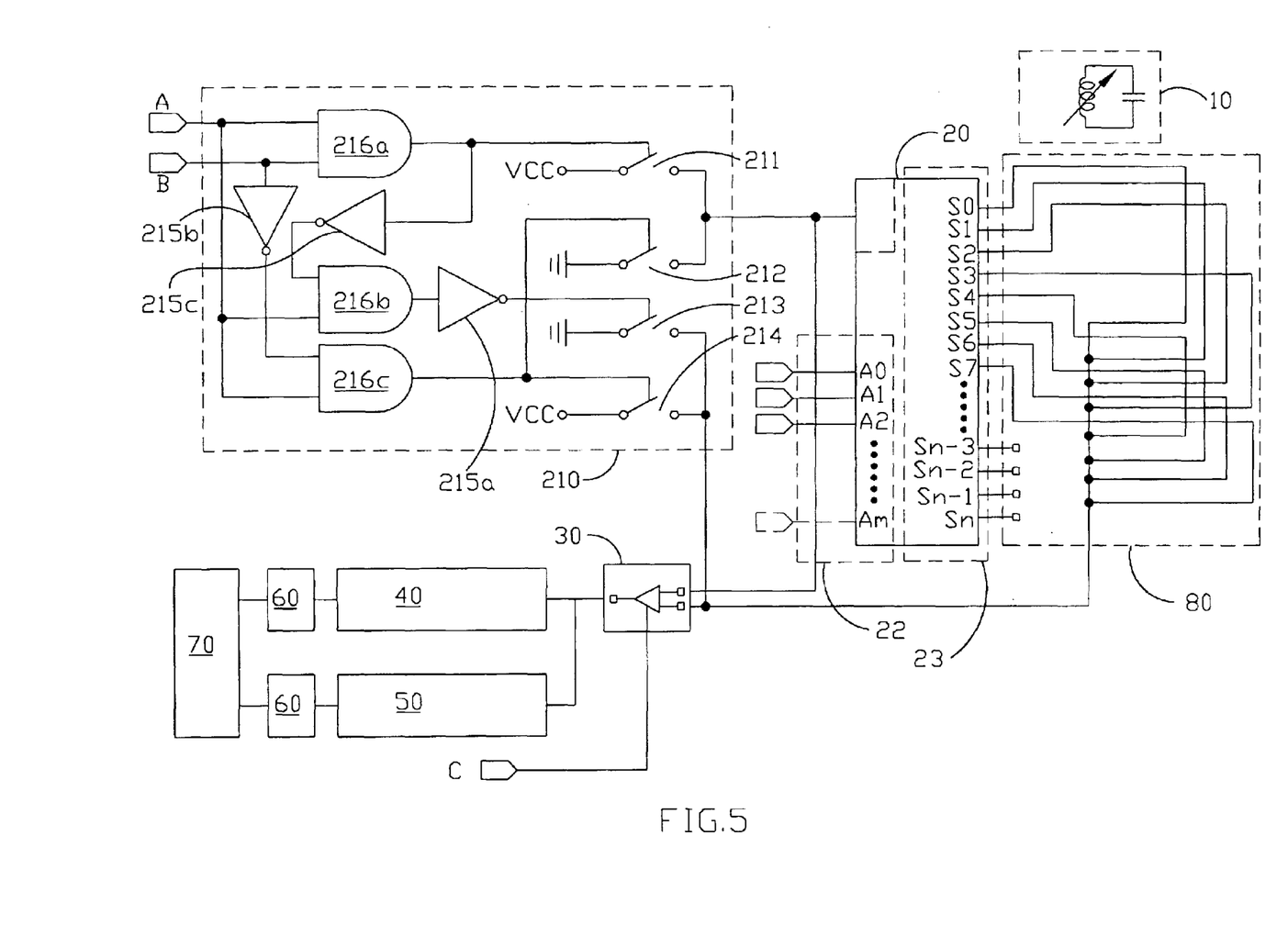
FIG. 5 is a diagram of circuit of preferred embodiment of the present invention.

In the following is detailed description of the present invention, and circuit operation of specific embodiment and preferred embodiment of the present invention are illustrated by FIG. 3 to FIG. 5.

First, referring FIG. 3, a diagram of circuit of specific embodiment of the present invention. In which comprised a cord less-battery less pointer apparatus 10, receiving electromagnetic energy transmitted from inductive loops set 80 on digitizer tablet system and transmitting another electromagnetic energy after storing electric energy with energy-storing circuit within it. Multi-channel switches set 20, further comprising a electric power source switch that can be controlled by transmitting/receiving signal and electric power source signal with the electric power source switches and its controlling circuits 21; a channel selector 22, turning on channel switch and transmitting/receiving signal through inductive loop in sequence according to full-scan signal (full-channel selecting signal) transmitted by microprocessor in transmitting/receiving duration, and transmitting/receiving signal through certain specific channels according to partial-scan signal (partial-channel selecting signal) transmitted by microprocessor; a channel switches set 23, searching a corresponding switch according to signal of channel selector 22 and switching on the switch. Inductive loops set 80, one end of which being electrically connected with channel switches set 23 and the other end being electrically connected with a common node for forming a close loop to transmit electromagnetic energy in transmitting duration, and forming a close loop and receiving electromagnetic energy transmitted from cord less-battery less pointer apparatus in receiving duration. A amplifier circuit 30, having the function of amplifying signal received, its enable/disable status being controlled by an amplifier enable/disable signal, the signal timing of which being similar to that of transmitting/receiving controlling signal. A position signal converting circuit 40, converting the received signal that is amplified. A pressure signal converting circuit 50, converting the received signal that is amplified. An analog to digital converter 60, converting analog signal output by the position signal converting circuit and the pressure signal converting circuit to digital signal. A microprocessor 70, mastering timing pulse for controlling transmitting/receiving and VCC, providing scanning signal (channel selecting signal), and processing calculation of position of cord less-battery less pointer apparatus according to digital signal provided by analog to digital converter.

Then, referring FIG. 4. Supposing signal is being transmitted in digitizer tablet system (in high electric level "1" timing), as is shown in FIG. 4a and FIG. 4b, when VCC supply signal "B" is in first period of high electric level ("1"), switch 211 in electric power source switches and its controlling circuits 21 will be in close ("on") status, at this time, electric power source switches and its controlling circuits 21 provide inductive loop with a VCC; and when electric power source signal "B" is in first period of low electric level ("0"), switch 211 in electric power source switches and its controlling circuits 21 in FIG. 3 will keep in open ("off") status, at this time, electric power source switches and its controlling circuits 21 cannot provide a VCC to inductive loop. Then, electric power source signal "B" processes repetitively according to the transmitting duration, the frequency of electric power source signal "B" almost equaling resonance frequency of resonance circuit 10 of pointer apparatus for inducting the strongest signal; taking what is shown in FIG. 4a and FIG. 4b for example, eight periods are processed in transmitting/receiving duration, which being only illustration and not confinement.

In transmitting duration, as is shown in FIG. 4b, it is according to time sequence of electric power source signal "B", as is shown in FIG. 4a, for close ("on") /open ("off") switch 211 in sequence. Before this, microprocessor will first transmit scanning signal (channel selecting signal) to channel selector 22 to turn on specific channel switch for forming a close loop with inductive loops set 80 that is connected with the channel switch for VCC to be provided to specific inductive loop through switch 211 and specific channel switch and for digitizer tablet system to transmit electromagnetic signal to adjacent space through the specific inductive loop. Besides, in transmitting duration, input terminal of amplifier 30 will also receive electric power source signal, which, however, is not a signal that should be received in circuit design of the present invention. Therefore, in order to avoid unnecessary signal interference, amplifier is disabled by amplifier enable/disable signal "C" for separating unnecessary signal received.

Supposing signal is being received in digitizer tablet system (transmitting/receiving signal A being in low electric level "0"), as is shown in FIG. 4a and FIG. 4b, no matter electric power source signal is in high electric level ("1") or low electric level ("0"), switch 211 in electric power source switches and its controlling circuit 21 in FIG. 3 will keep in open ("off") status.

In receiving duration, since switch 211 in electric power source switches and its controlling circuits 21 are both keep in open ("off") status, without any VCC will be provided to inductive loops set 80. At this time, since cord less-battery less pointer apparatus can induce, receive, and store an electromagnetic energy transmitted by inductive loops set 80 and then transmit another electromagnetic energy. Therefore, after scanning electromagnetic signal transmitting and receiving of each inductive loop, a plurality of inductive loops receiving stronger signal can be found out, which is "full-scan"; "partial-scan" is then processed, the plurality of inductive loops receiving stronger signals inducing electromagnetic signal transmitted by inductive loop receiving strongest signal and then receiving electromagnetic signal from the plurality of inductive loops for cord less-battery less pointer apparatus 10 to receive electromagnetic signal and then transmit another electromagnetic signal to inductive loops, which transmits the signal to amplifier circuit 30 after receives it. After the signal transmitted by cord less-battery less pointer apparatus is received by digitizer tablet system and processed by amplifier circuit 30, it is then transmitted to position signal converting circuit 40 and pressure signal converting circuit 50, which then transmit the converted signal to separate analog to digital converter 60 for converting it to digital signal that is then transmitted to microprocessor 70 for calculating accurate position of cord less-battery less pointer apparatus 10 and relative status message through calculation of coordinates and judgment.

In the specific embodiment of the present invention, Multi-channel switches set 20 are used to replace analog switch and tri-state driver for reducing "on" status impedance to the range between 0.25 ohm($\Omega$) and 10 ohm($\Omega$) through a switch produced in semi-conductor process. Therefore when switch 211 is turned on in transmitting duration, VCC can be transmitted directly through switch 211 and channel switches set 23 for transmitting current to inductive loops set 80 for transmitting an electromagnetic energy. Comparing to "on" status impedance of analog switch used in prior art, "on" status impedance of switch 211 in Multi-channel switches set 20 is quite low. Therefore, voltage drop on "on" status impedance becomes relatively low, and a great part of voltage can be transmitted to inductive loops, which makes power efficiency of transmission higher than that in prior art using analog switch circuit. And, the deployment of circuit is also simpler and saves more space than that in prior art. The number of channel switches in specific embodiment of the present invention is not limited but decided according to size of digitizer tablet system and design of inductive loops set 80.

Although power efficiency of transmitting/receiving can be increased, electric power source switch and its controlling circuits can be simplified, and space occupied by circuit can be reduced by the digitizer tablet system described in specific embodiment of the present invention, in control of electric power source signal timing, VCC can be turned on and transmitted to inductive loops set 80 for transmitting electromagnetic signal only when it is in high electric level. In view of this, the present invention further provides a preferred embodiment for increasing transmitting power efficiency of digitizer tablet system, improving electric power source switch and its controlling circuits 21 described in above specific embodiment for channel selector 22 having selecting function to select a specific channel while transmitting signal for certain specific power switches 211~214 to provide VCC to specific inductive loop in high electric level and low electric level of electric power source signal. Therefore specific inductive loop of digitizer tablet system can form a close loop in high electric level and low electric level of power supply signal. But the directions of current in high electric level and in low electric level are opposite so that stronger electromagnetic energy can be provided to a specific inductive loop (circuit in detail will be described in FIG. 5 in the following). While receiving signal, a specific channel 23 corresponding channel selector 22 can also be turned on through selection of channel selector 22 for receiving another signal transmitted by cord less-battery less pointer apparatus. However, the turned-on channel 23 is different from the channel turned on while transmitting signal. And a specific electric power source switch will be kept in grounding status while receiving signal for making the specific inductive loop a close loop.

FIG. 5 is a diagram of circuit of preferred embodiment of the present invention. In transmitting duration, close loops formed by switches (211, 212, 213, 214) in electric power source switch and its controlling circuits 210 will have currents of opposite properties when their electric power source signals are in high electric level "1" and low electric level "0," therefore, electric power source switches and its controlling circuits used in specific embodiment of the present invention can be called bi-polar electric power source switches and its controlling circuits 210.

Besides, except different electric power source switches and its controlling circuits (21 and 211), the functions of every part of circuits in diagram of circuit of embodiment shown in FIG. 3 and in diagram of circuit of preferred embodiment shown in FIG. 5 are the same. Therefore the function of circuit of preferred embodiment shown in FIG. 5 of the present invention is not described repetitively and only improved bi-polar electric power source switches and its controlling circuit 210 is described in detail to simplify long, repetitive description.

Supposing signal is being transmitted in digitizer tablet system (i.e. transmitting/receiving signal is in high electric level "1"), as is shown in FIG. 4*a* and FIG. 4*b*, thus when electric power source signal is in first period of high electric level "1", and switches 211 and 213 in electric power source switches and its controlling circuits 210 will be in close ("on") status, at this time, switch 211 will connect a VCC, and switch 213 will be grounding; however, the other two switches 212 and 214 keep in open ("off") status. Then, when electric power source signal is in first period of low electric level "0", switches 211 and 213 in bi-polar electric power source switches and its controlling circuits 210 in FIG. 5 keep in open ("off") status, and switches 212 and 214 become close ("on") status, at this time, switch 212 will become grounding and switch 214 will connect a VCC. Then, the process is carried out repetitively according to the electric power source signal. According to the above-mentioned, bi-polar power source switches and its controlling circuit 210 in preferred embodiment of the present invention, not matter it is in high electric level or low electric level of power supply signal time sequence, will connect the turned-on switches with a VCC and a grounding bond.

And still taking FIG. 4*a* and FIG. 4*b* for example, eight periods are processed in transmitting/receiving duration, and these eight periods are only for illustration and not confinement.

In signal transmitting duration, microprocessor will transmit scanning (channel selecting) signal that select to turn on corresponding switch through channel selector 22 in sequence and form a close loop with inductive loops set 80, with which is connected for transmitting VCC through bi-polar electric power source switches and its controlling circuits 210, and a corresponding switch to inductive loops set 80 for digitizer tablet system to transmit electromagnetic signal to adjacent space. For example, when signal is transmitted in digitizer tablet system (i.e. transmitting/receiving signal is in high electric level "1") and electric power source signal is in first period of high electric level "1", switches 211 and 213 in bi-polar electric power source switches and its controlling circuits 210 in FIG. 5 will both become close ("on") status, at this time, switch 211 will connect a VCC and switch 213 will become grounding. Therefore the current flows from switch 211 to inductive loop to switch 213, and switch 211, switch 213, and inductive loop will form a close loop.

Then, when electric power source signal is in first period of low electric level "0", switches 211 and 213 in bi-polar electric power source switches and its controlling circuits 210 in FIG. 5 will keep in open ("off") status, and the two switches 212 and 214 will become close ("on") status, at this time, switch 212 will become grounding and switch 214 will connect a VCC. Therefore the current flows from switch 214 to inductive loop to switch 212, and switch 212, switch 214, and inductive loop form a close loop. Then the process is carried out repetitively according to period of electric power source signal in transmitting duration. According to the above-mentioned, bi-polar electric power source switches and its controlling circuits 210 in preferred embodiment of the present invention, no matter in high electric level or low electric level of electric power source signal, will form a close loop with inductive loops set 80. The inductive loop formed at this time has opposite properties, therefore no matter in high electric level or low electric level of electric power source signal, the digitizer tablet system of the present invention can transmit electromagnetic signal to adjacent space, which thus achieves greater transmitting power. However, in order to avoid interference of unnecessary signal, the same, microprocessor will transmit an amplifier enable/disable signal synchronously, as is shown in FIG. 4*c*, for keeping amplifier circuit 30 in disable status to separate unnecessary signal received while signal is being transmitted in digitizer tablet system.

Supposing signal is being received in digitizer tablet system (i.e. transmitting/receiving signal is in low electric level "0"), as is shown in FIG. 4*a* and FIG. 4*b*, thus when electric power source signal is in first period of high electric level "1", switches 211, 212, and 214 in bi-polar electric power source switches and its controlling circuits 210 in FIG. 5 will keep in open ("off") status, only switch 213 being connected with grounding; when electric power source signal is in first period of low electric level "0", among bi-polar electric power source switches and its controlling circuits 210 in FIG. 5, only switch 213 still keeps in close ("on") status, and switches 211, 212 and 214 keep in open ("off") status. Then, the process is carried out repetitively according to period of electric power source signal in receiving duration, which means switch 213 keeping in grounding status in period of high electric level and low electric level of electric power source signal while electromagnetic energy transmitted by cord less-battery less pointer apparatus is being received.

Since cord less-battery less pointer apparatus 10 can induce, receive, and store an electromagnetic energy transmitted by inductive loops set 80 and then transmit another electromagnetic energy while signal is being transmitted, which is described above. According to FIG. 5, after full-scan is processed on inductive loops set 80, a plurality of inductive loops receiving stronger signal can be found out. Therefore partial-scan can be then processed on the plurality of inductive loops receiving stronger signals for the electromagnetic signal transmitted by cord less-battery less pointer apparatus 10 to be induced and received by the plurality of inductive loops receiving stronger signals and then transmitted to amplifier circuit 30 according to transmitting/receiving signal. After the signal transmitted by cord less-battery less pointer apparatus 10 is received by digitizer tablet system and processed by amplifier circuit 30, it is then transmitted to position signal converting circuit 40 and pressure signal converting circuit 50, which then transmit the induced signal to digital signal through separate analog to digital converter 60, which is then transmitted to microprocessor 70 for calculating accurate position of cord less-battery less pointer apparatus 10 and relative status message through calculation of coordinates and judgment.

In the specific embodiment of the present invention, still, multi-channel switches set 20 are used to replace analog switch and tri-state driver for reducing "on" status impedance through switch produced in semiconductor process. Therefore when bi-polar electric power source switches and its controlling circuits 210 is turned on in transmitting duration, it can form a close loop with inductive loop and transmit VCC directly through turned-on channel switches set 23 for transmitting current to inductive loops set 80 for transmitting an electromagnetic energy. Comparing to "on" status impedance in prior art, "on" status impedance in multi-channel switches set 20 is quite low. Therefore, voltage drop on "on" status impedance becomes relatively low, and a great part of voltage can be transmitted to inductive loops set 80. Moreover, in period of both high electric level and low electric level of electric power source signal, inductive loop can transmit electromagnetic signal. Thus the power efficiency of transmission is higher than that in prior art using analog switch circuit. And, the deployment of circuit is also simpler and saves more space than that in prior art. The number of channel switches set 23 in specific embodiment of the present invention is not limited but decided according to size of digitizer tablet system and design of inductive loops set 80.

According to what is described above, in the preferred embodiment of the present invention, a method for transmitting and receiving signal between inductive loop in digitizer tablet system controlled by switch with bi-polar transmitting/receiving function and cord less-battery less pointer apparatus is provided. In which multi-channel switches set 20 with bi-polar transmitting/receiving function is used as controlling circuit of electromagnetic power source of digitizer tablet system while transmitting/receiving signal. While transmitting signal, a specific channel can be selected by channel selector 22 with selecting function for turning on a specific channel switch 23 corresponding to channel selector in both high electric level and low electric level. Therefore a close loop is formed in digitizer tablet system in period of both high electric level and low electric level, and VCC for transmitting electromagnetic energy can be then provided to an inductive loop connected with turned-on channel. While receiving signal, a specific channel switch 23 corresponding to channel selector 22 can be turned on through selecting of channel selector 22 for receiving another signal transmitted by cord less-battery less pointer apparatus. However, the turned-on channel may be different from the channel turned on while transmitting signal. Besides, while receiving signal, a specific electric power source switch will be kept in grounding status for keeping referential electric level of signal received at zero. With the improvement described above, the present invention conforms to economic benefits and industrial availability.

Of course, the present invention can be applied on inductive loops in any electromagnetic inductive system with battery-less pointer apparatus and also any method for positioning coordinates of inductive loops. Obviously, according to the embodiments described above, there may be some modifications and variations of the present invention. Therefore it should be comprehended in appended claims that, in addition to embodiments described above in detail, the present invention can also be widely applied in other embodiments.

What is described above is only preferred embodiment of the present invention, not for confining the claims of the present invention; any equal-effect variations or modifications made within the spirit disclosed by the present invention should be included in the appended claims.

What is claimed is:

1. A digitizer tablet system in which signal transmitting/receiving between inductive loops and cord less-battery less pointer apparatus is controlled by multi-channel switches set, comprising:

a cord less-battery less pointer apparatus, receiving a first electromagnetic signal transmitted by a inductive loops set and storing electric energy through electromagnetic induction for transmitting a second electromagnetic signal;

a multi-channel switches set, electrically connected with a microprocessor, an amplifier circuit and said inductive loops set, selecting a specific inductive loop to transmit/receive said first electromagnetic signal and said second electromagnetic signal when said digitizer tablet system being in transmitting/receiving duration, said multi-channel switches set and its circuit further comprising:

an electric power source switches set and controlling circuits, controlling the on or off status of the electric power source switches through a transmitting/receiving signal and a electric power source signal;

a channel selector, electrically connected with said microprocessor, turning on a specific switch and transmitting/receiving signal through respective inductive loop in sequence according to scanning signal transmitted by said microprocessor in said transmitting/receiving duration of said digitizer tablet system;

a channel switches set, electrically connected with said inductive loops set respectively, selecting a specific corresponding channel according to channel selecting signal and electrically connecting said specific channel, said electric power source switches set and controlling circuits/amplifier circuit; and an inductive loops set, one end being respectively electrically connected with said channel switches set and the other end electrically connected with a common node for forming a close loop and transmitting said first electromagnetic signal in transmitting duration, and receiving said second electromagnetic signal transmitted by said cord less-battery less pointer apparatus in receiving duration;

an amplifier circuit, electrically connected with said multi-channel switches set, having the function of amplifying said second electromagnetic signal received;

a position signal converting circuit, electrically connected with said amplifier circuit and an analog to digital converter, having the function of converting said amplified signal to position signal;

a pressure signal converting circuit, electrically connected with said amplifier circuit and said analog to digital converter, having the function of converting said amplified signal to pressure signal;

an analog to digital converter, electrically connected with said position signal converting circuit and said pressure signal converting circuit, having the function of converting analog signal converted by said position signal converting circuit and said pressure signal converting circuit to digital signal; and a microprocessor, electrically connected with said multi-channel switches set and said analog to digital converter, providing the signal for controlling said transmitting/receiving and the electric power source signal, having the function of providing scanning signal, and calculating the coordinates of cord less-battery less pointer apparatus according to digital signal provided by said analog to digital converter.

2. The digitizer tablet system of claim 1, wherein said scanning signal transmitted by said microprocessor comprises a full-scan signal and a partial-scan signal.

3. The digitizer tablet system of claim 1, wherein the relation between the pin number of said channel selector and the pin number of said channel switches is decided according to the size of said digitizer tablet system and the design of said inductive loops set.

4. The digitizer tablet system of claim 1, wherein common node electrically connected with said inductive loops set can be connected to grounding.

5. A method for transmitting and receiving signal between inductive loops controlled by multi-channel switches set and cord less-battery less pointer apparatus in digitizer tablet system, said transmitting and receiving method comprising:

in transmitting duration,
first, providing a transmitting signal in high electric level "1" and an electric power source signal in first period of high electric level "1";
turning on two specific switches of the electric power source switches and controlling circuits, one said switch being connected to a electric power source and the other said switch being grounding;
a scanning signal being provided to said channel selector by a microprocessor for corresponding a specific channel and turning on said specific switch in the initial stage of signal transmitting;
forming a close loop with an inductive loop, providing said, inductive loop with the electric power source through said two switches, enabling said digitizer tablet system to transmit an electromagnetic signal to adjacent space;
then, also in transmitting duration, in first low electric level "0" period of electric power source signal;
turning on the other two specific switches of the electric power source switches and controlling circuits, one said switch being grounding and the other said switch being connected to electric power source;
providing an amplifier disabling signal for keeping amplifier circuit in disable status; and
practicing repetitively according to said electric power source signal in this transmitting duration;

in receiving duration,
first providing a receiving signal in low electric level "0" and an electric power source signal in first period of high electric level "1";
keeping three specific switches of said electric power source switches and controlling circuits in open status, only one specific switch which electrically connected with a common node of inductive loops being kept close status;
then, also in receiving duration, in first low electric level "0" period of electric power source signal, still keeping same three switches of said electric power source switches and controlling circuits in open status, only one specific switch which electrically connected with a common node of inductive loops still being kept close status;
a scanning signal being provided to said channel selector by said microprocessor for corresponding a specific channel and turning on said specific switch in the initial stage of signal receiving; and
receiving said electromagnetic signal transmitted by said cord less-battery less pointer apparatus.

6. A digitizer tablet system in which signal transmitting/receiving between inductive loops and cord less-battery less pointer apparatus is controlled by multi-channel switches set that provides inductive loops with bi-polar electric power source, comprising:

a cord less-battery less pointer apparatus, receiving a first electromagnetic signal transmitted by a inductive loops set and storing electric energy through electromagnetic induction for transmitting a second electromagnetic signal;

a multi-channel switches set, electrically connected with a microprocessor, an amplifier circuit and said inductive loops set, selecting a specific inductive loop to transmit/receive said first electromagnetic signal and said second electromagnetic signal when said digitizer tablet system being in the timing of transmitting/receiving, said multi-channel switches set further comprising:

a bi-polar electric power source switches set and controlling circuits, controlling the on or off status of the electric power source switches through a transmitting/receiving signal and an electric power source signal;

a channel selector, electrically connected with said microprocessor, turning on a specific switch and transmitting/receiving signal through respective inductive loop in sequence according to scanning signal transmitted by said microprocessor in said transmitting/receiving duration of said digitizer tablet system;

a channel switches set, electrically connected with said inductive loops set respectively, selecting a specific corresponding channel according to channel selecting signal and electrically connecting said specific channel, said electric power source switches set and controlling circuits/said amplifier circuit; and an inductive loops set, one end being respectively electrically connected with said channel switches set and the other end electrically connected with said bi-polar electric power source and controlling circuits and an amplifier circuit for forming a close loop and transmitting said first electromagnetic signal in transmitting duration, and receiving said second electromagnetic signal transmitted by said cord less-battery less pointer apparatus in receiving duration;

an amplifier circuit, electrically connected with said multi-channel switches set, having the function of amplifying said second electromagnetic signal received;

a position signal converting circuit, electrically connected with said amplifier circuit and an analog to digital converter, having the function of converting said amplified signal to position signal;

a pressure signal converting circuit, electrically connected with said amplifier circuit and an analog to digital converter, having the function of converting said amplified signal to pressure signal;

an analog to digital converter, electrically connected with said position signal converting circuit and said pressure signal converting circuit, having the function of converting analog signal converted by said position signal converting circuit and said pressure signal converting circuit to digital signal; and a microprocessor, electrically connected with said multi-channel switches set and said analog to digital converter, providing the signal for controlling said transmitting/receiving and the electric power source signal, having the function of providing scanning signal, and calculating the coordinates of cord less-battery less pointer apparatus according to digital signal provided by said analog to digital converter.

7. The digitizer tablet system of claim 6, wherein said scanning signal transmitted by said microprocessor comprises a full-scan signal and a partial-scan signal.

8. The digitizer tablet system of claim 6, wherein the relation between the pin number of said channel selector and the pin number of said channel switches is decided according to the size of said digitizer tablet system and the design of said inductive loops set.

9. The digitizer tablet system of claim 6, wherein the polarity of current of close loop formed by said inductive loop while transmitting signal is alternatively opposite.

10. A method for transmitting and receiving signal between inductive loops controlled by multi-channel switches set that provides inductive loops with bi-polar electric power source and cord less-battery less pointer apparatus in digitizer tablet system, said transmitting and receiving method comprising:

in transmitting duration,
first, providing a transmitting signal in high electric level "1" and an electric power source signal in first period of high electric level "1";
turning on two specific switches of the electric power source switches and controlling circuits, said two switches being connected to a electric power source and a grounding, connecting one end of an inductive loop to said power source and the other end to said grounding;
a scanning signal being provided to channel selector by a microprocessor for corresponding a specific channel and turning on said specific switch in the initial stage of signal transmitting, making inductive loop a close loop and providing said electric power source to said inductive loops set;
then, also in signal transmitting duration, in first low electric level "0" period of electric power source signal;
turning on the other two specific switches of the electric power source switches and controlling circuits, said two specific switches being connected respectively to a grounding and said electric power source, connecting one end of inductive loop to said grounding and the other end to said power source;
providing an amplifier enable/disable signal for keeping amplifier circuit in disable status; and
practicing repetitively according to said electric power source signal in this transmitting duration;

in receiving duration,
providing a receiving signal in low electric level "0" and an electric power source signal in first period of high electric level "1";
keeping the switch electrically connecting said electric power source switches and controlling circuits and said common node in grounding status;
a scanning signal being provided to said channel selector by said microprocessor for corresponding a specific channel and turning on said specific channel in the initial stage of signal receiving, forming inductive loop into a close loop; and
receiving said electromagnetic signal transmitted by a cord less-battery less pointer apparatus.

11. The method of claim 10, wherein in said transmitting duration, when said electric power source signal is in high electric level, said inductive loop forms a close loop through said channel switches set.

12. The method of claim 10, wherein in said transmitting duration, when said electric power source signal is in low electric level, said inductive loop forms a close loop through said channel switches set.

13. The method of claim 10, wherein in said transmitting duration, the direction of current in inductive loop when said electric power source signal is in high electric level is opposite to that in inductive loop when said electric power source signal is in low electric level.

14. The method of claim 10, wherein in said receiving duration, no matter said electric power source signal is in high electric level or low electric level, said inductive loop forms a close loop through said channel switches set for receiving said second electromagnetic signal transmitted by said cord less-battery less pointer apparatus.

15. The method of claim 10, wherein frequency of said electric power source signal almost equals to resonance frequency of resonance circuit of said cord less-battery less pointer apparatus for inducing the strongest signal.

* * * * *